United States Patent
Tomasz et al.

(10) Patent No.: US 10,697,504 B2
(45) Date of Patent: Jun. 30, 2020

(54) PAD AND SPRING ASSEMBLY FOR A DISC BRAKE CALIPER

(71) Applicant: FRENI BREMBO S.P.A., Curno, Bergamo (IT)

(72) Inventors: Woloszyn Tomasz, Curno (IT); Simone Berra, Curno (IT); Marco Ratti, Curno (IT)

(73) Assignee: Freni Brembo S.p.A., Curno, Brembo (IT)

( * ) Notice: Subject to any disclaimer, the term of this patent is extended or adjusted under 35 U.S.C. 154(b) by 124 days.

(21) Appl. No.: 15/547,332

(22) PCT Filed: Jan. 27, 2016

(86) PCT No.: PCT/IB2016/050403
§ 371 (c)(1),
(2) Date: Jul. 28, 2017

(87) PCT Pub. No.: WO2016/120800
PCT Pub. Date: Aug. 4, 2016

(65) Prior Publication Data
US 2018/0023640 A1 Jan. 25, 2018

(30) Foreign Application Priority Data

Jan. 30, 2015 (IT) .................................. 2015A0001

(51) Int. Cl.
*F16D 55/2265* (2006.01)
*F16D 65/097* (2006.01)

(52) U.S. Cl.
CPC ..... *F16D 55/2265* (2013.01); *F16D 65/0978* (2013.01); *F16D 65/0979* (2013.01)

(58) Field of Classification Search
CPC ............. F16D 55/2265; F16D 65/0978; F16D 65/0979
See application file for complete search history.

(56) References Cited

U.S. PATENT DOCUMENTS

| | | | |
|---|---|---|---|
| 4,082,166 A | 4/1978 | Ritsema | |
| 4,225,017 A * | 9/1980 | Op den Camp | .... F16D 55/2265 |
| | | | 188/73.38 |

(Continued)

FOREIGN PATENT DOCUMENTS

| | | |
|---|---|---|
| DE | 4318744 C1 | 9/1994 |
| DE | 102011118736 A1 | 5/2013 |

OTHER PUBLICATIONS

Machine-generated English Translation of DE 43 18 744, obtained via Espacenet Patent Search.

(Continued)

*Primary Examiner* — Melody M Burch
(74) *Attorney, Agent, or Firm* — Marshall & Melhorn, LLC

(57) ABSTRACT

An assembly (1) for a disc brake caliper (100), in which, when said caliper (101) is arranged astride a disc (3) of a disc brake (100) having a defined rotation axis (C), said assembly (1) defines an axial direction (X-X) parallel to said rotation axis (C), a radial direction (R-R) orthogonal to said axial direction (X-X) and a tangential or circumferential direction (T-T) orthogonal to both the axial direction (X-X) and the radial direction (R-R), said assembly (1) comprises:
  a first pad (10) comprising a friction material (12), defining a friction surface, and a support plate (13) which supports said friction material (12) and is adapted to release the braking action onto the caliper (101) of the disc brake (100), in which
  said support plate (13) comprises at least one lateral projection (14) which extends in a direction substantially coplanar to the plate (13) and is placed at an end of the support plate (13), and in which
  said at least one lateral projection (14) is adapted to be accommodated in a pocket (19) obtained in the body of the caliper (101);

(Continued)

said assembly (1) further comprising at least one spring (30), in which said spring (30) is connected to said lateral projection (14) of said support plate (13), and in which said spring (30) being adapted to be accommodated in a seat (34) obtained in the body of the caliper (101) at said pocket (19), and in which said spring (30) is adapted to be inserted in said seat (34) to be fastened in an undercut manner against said undercut surface (34) to bias said pad (10) in the axial direction (X-X).

10 Claims, 11 Drawing Sheets

(56) References Cited

U.S. PATENT DOCUMENTS

| 4,580,664 | A | * | 4/1986 | Kondo | F16D 55/2265 188/205 A |
|---|---|---|---|---|---|
| 5,706,916 | A | * | 1/1998 | Cortes Guasch | F16D 55/224 188/73.38 |
| 7,318,503 | B2 | * | 1/2008 | Farooq | F16D 65/0974 188/205 A |
| 2007/0170020 | A1 | * | 7/2007 | Halasy-Wimmer | F16D 55/22 188/73.43 |
| 2008/0087507 | A1 | | 4/2008 | Demorais et al. | |
| 2011/0226566 | A1 | * | 9/2011 | Zenzen | F16D 65/095 188/72.4 |
| 2014/0367208 | A1 | | 12/2014 | Miyake et al. | |

OTHER PUBLICATIONS

Machine-generated English Translation of DE 10 2011 118736, obtained via Espacenet Patent Search.

International Search Report for International Appln. No. PCT/IB2016/050403 (dated Jun. 1, 2016).

* cited by examiner

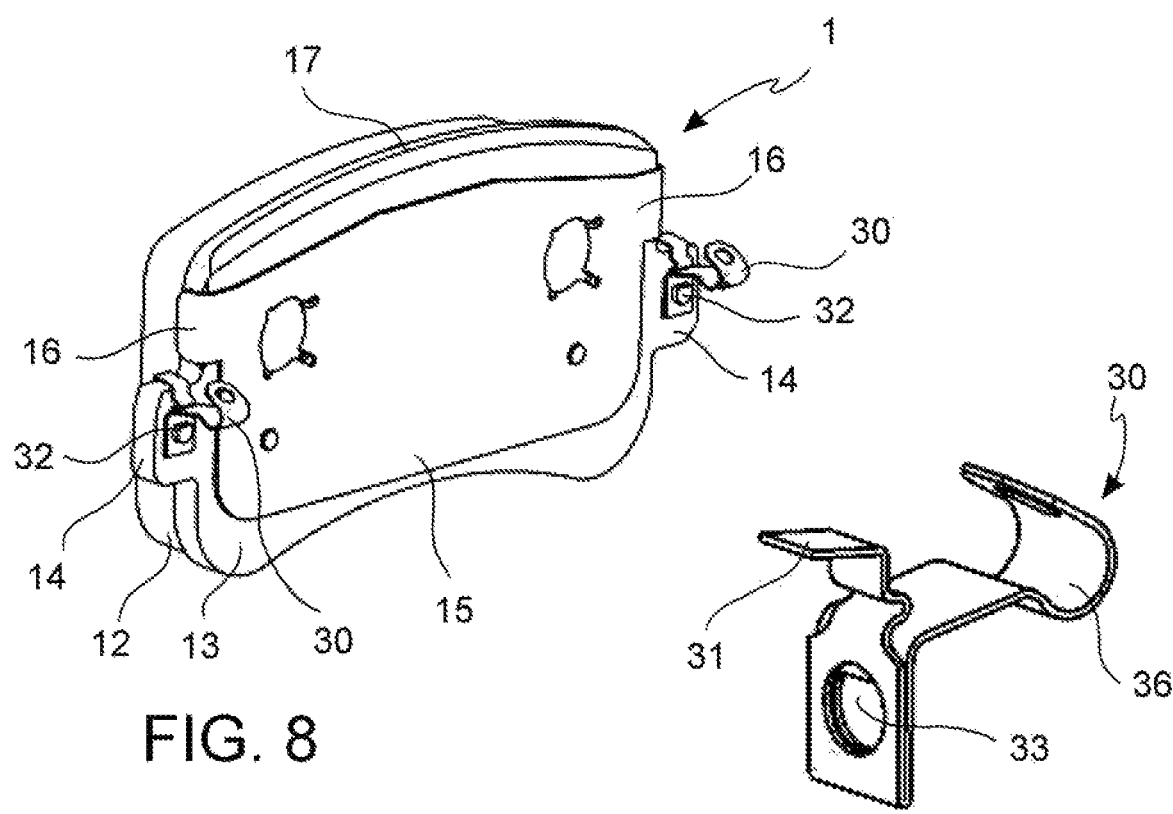
FIG. 8
FIG. 10
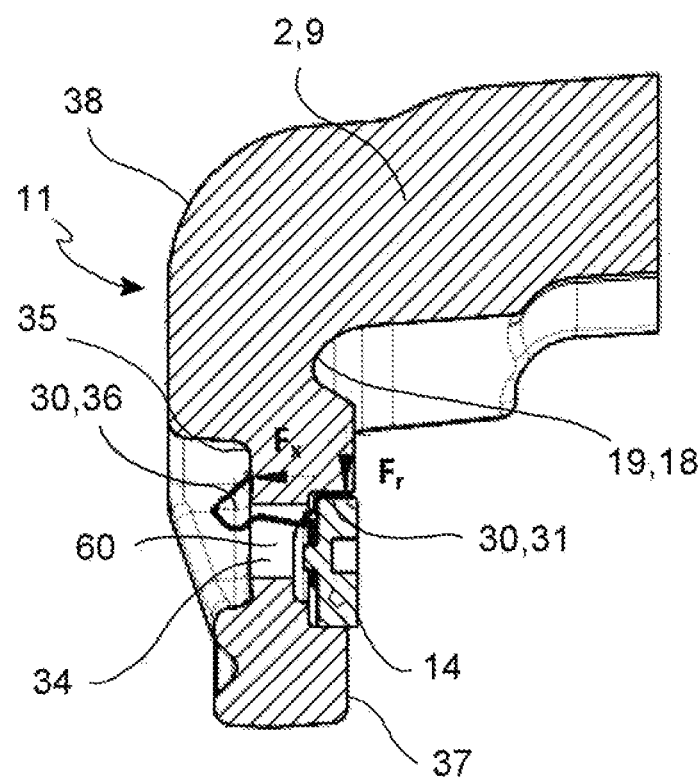
FIG. 9

PAD AND SPRING ASSEMBLY FOR A DISC BRAKE CALIPER

FIELD OF THE INVENTION

The present invention relates to a pad and spring assembly for a brake caliper of a brake disc.

In particular, the present invention relates to a pad and spring assembly for an asymmetric type caliper.

For example, a floating caliper of the asymmetric type comprises a caliper body and a bracket, in which the caliper body is adapted to be arranged astride the brake disc, extending from an inner side of the caliper, or side facing towards the vehicle, or support side, to an outer side of the caliper, or side facing towards the vehicle wheel, or reaction side; the bracket comprises elements for fixing the disc brake caliper to a respective support, e.g. seats or eye-bolts for accommodating screw studs or fastening bolts; the caliper body is sliding with respect to the brake along an axial direction (X-X); the caliper comprises coupling elements between the caliper body and the bracket, adapted to allow the relative sliding between caliper and bracket parallel to the axial direction (X-X); the bracket extends at the inner side of the caliper only and delimits a first seat for housing at least one first pad to exert the braking action on an inner face or inner braking surface of the brake disc. The caliper body delimits a second seat, axially opposed to the first seat but angularly offset therefrom, so as to house at least one second pad in order to exert a braking action on an outer face, or outer braking surface, of the brake disc facing towards the outer side of the caliper. The coupling means between caliper and brake comprise two guiding pins which allow and guide a relative sliding along the axial direction (X-X) of the caliper body with respect to the bracket.

BACKGROUND ART

Floating calipers, or "sliding" disc brake calipers in other words, having moveable caliper bodies on guides fixed to support brackets are known. In these known calipers, the braking action is exerted by thrust means, cylinder-piston means, positioned only on one side of the caliper body, the inner side or side facing towards the vehicle, to exert a thrust on friction elements, typically brake pads against a first braking surface which faces the inner side of the brake body.

For example, international patent application WO2012/156849 by the same applicant, shows calipers of the floating type for brake disc, in which, in order to reduce dimensions and weight, the supporting bracket is provided on only one side of the caliper, particularly on the inner side, and the sliding of the brake body with respect to the bracket, i.e. in axial direction, occurs on guiding pins.

However, because of their lightness and dimensions, the known calipers of floating type described here are subject to considerable deformation when subject to the braking action.

In particular, as known from patent FR1360566, the imbalance of the axial and tangential forces acting on the caliper body of the floating type tends to move the barycenter of the pressure areas on an associable brake disc, generating a self-locking effect of the caliper, and consequently localizing maximum wear on the side edges of the pads in contact with an associable brake disc.

The need is thus felt to compensate the imbalance of the braking action defined by the deformation of the caliper body and accentuated by the fact that the aforesaid guiding pins impose even minimum clearances in the sliding of the caliper body with respect to the bracket.

For example, from documents US2007/0256900A1, EP0145593B1, EP0489452A1 and JPH0932870A floating type calipers are known in which the pads or braking elements arranged on opposite sides of the brake caliper and facing towards opposite surfaces of an associable brake disc are arranged in misaligned position, i.e. in shifted position with respect to one another according to the circumferential coordinate of an associable brake disc, and particularly the inner braking element is arranged in advance relative to the sense of rotation of an associable brake disc. In these known solutions, a moment it thus generated on the caliper body which tends to compensate the imbalance of the braking action described above.

In particular, document US2014/0251736A1 shows a caliper of the floating type in which a set of springs of different type and shape cooperate to fix the outer braking element, or outer pad, to the central upper portion of the brake caliper.

However advantageous, such solutions do not fully solve the problem because the braking element of the outer side of the brake body, the side free from supporting bracket, is constrained in weak manner to the caliper body itself, thus being able to turn on itself and/or be arranged differently according to the degree of wear, thus thwarting at least in part the accurate design of the geometric misalignment of the opposite, facing braking elements, made to compensate for the structural deformation of the brake caliper.

Other solutions are known from documents US 2014/367208, DE 10 2011 118736, DE 43 18 744 and U.S. Pat. No. 4,082,166.

Solution

It is the object of the present invention to solve the drawbacks of the prior art and to provide a solution to the need of providing a floating type caliper which is lightweight but has an accurate braking action.

Advantageously, an improved accuracy of the braking action allows to reduce the dimensions of the braking system or to obtain better braking performance, the dimensions being equal.

This and other objects are achieved by means of a pad and spring assembly for floating caliper according to claim 1, as well as a floating caliper associable to a brake disc according to claims 10 and 16, and a disc brake according to claims 14 and 20, and a method according to claims 15 and 21.

Some advantageous embodiments are the object of the dependent claims.

FIGURES

Further features and advantages of the assembly and method according to the invention will be apparent from the description provided below of preferred embodiments thereof, given by way of non-limiting example, with reference to the accompanying drawings, in which:

FIG. 8 is a perspective view of a pad on reaction side,

FIG. 9 is a section view taken along the line IX-IX in FIG. 7;

FIG. 10 is an enlarged perspective view of a spring according to an embodiment of the invention;

DESCRIPTION OF SOME PREFERRED EMBODIMENTS

Figure 1:
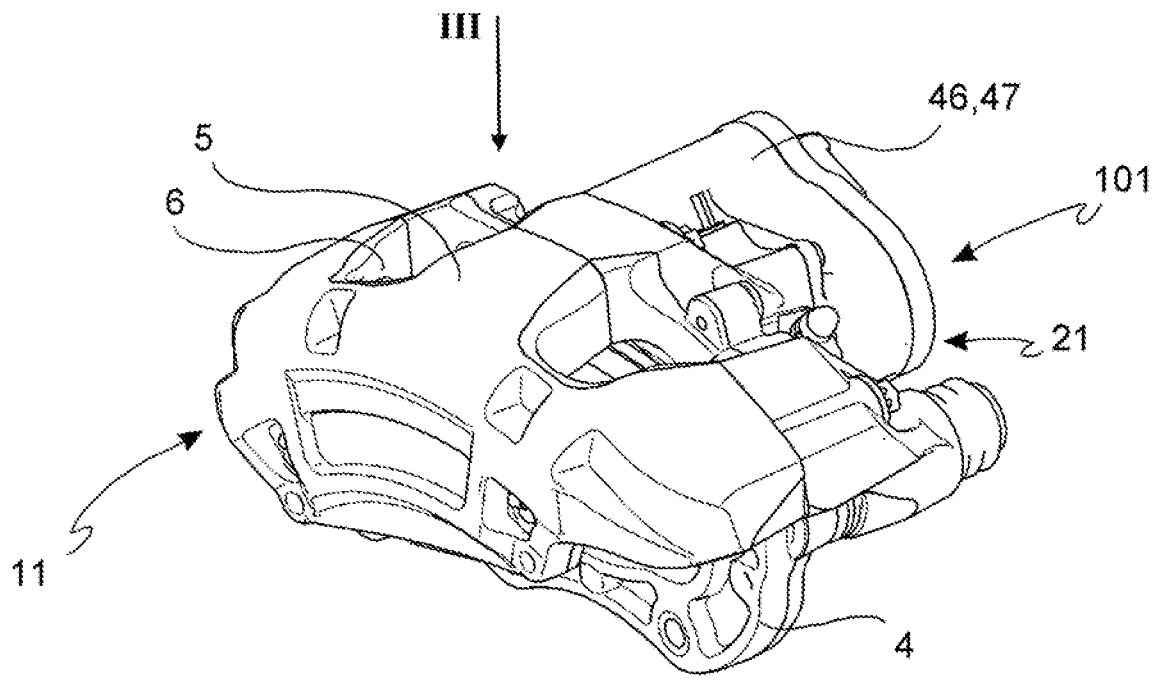
FIGS. 1 and 2 are perspective views of a floating caliper according to the invention.
Figure 2:
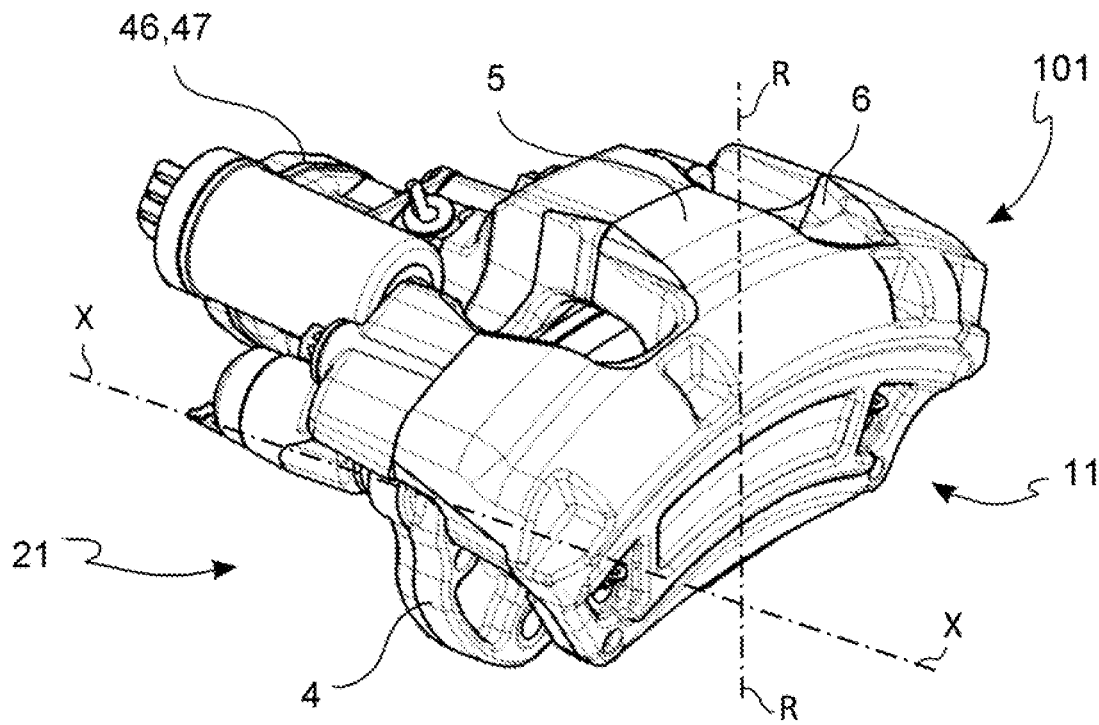
Figure 3:
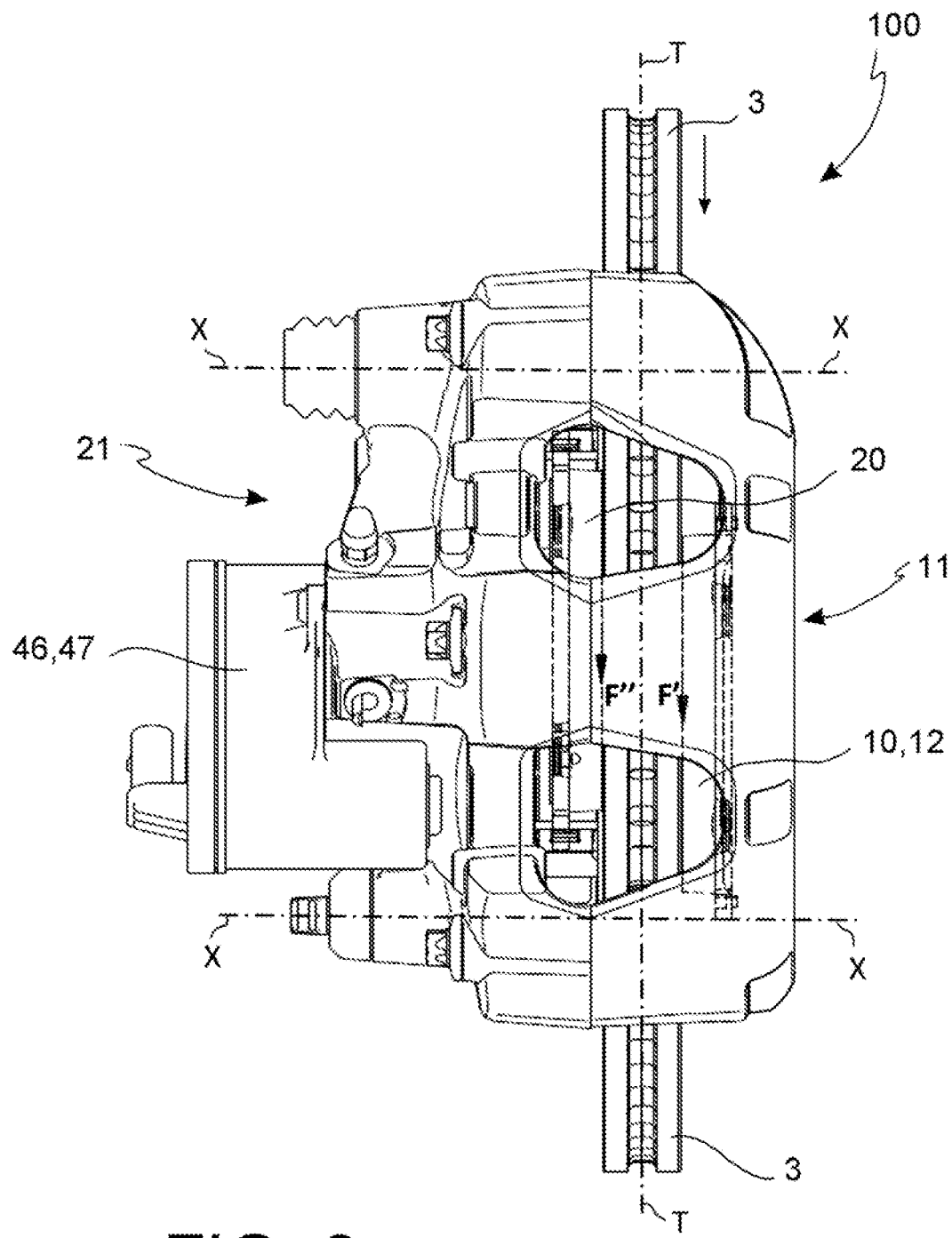
FIG. 3 is a top view taken from the side indicated by the arrow III in FIG. 1.
Figure 4:
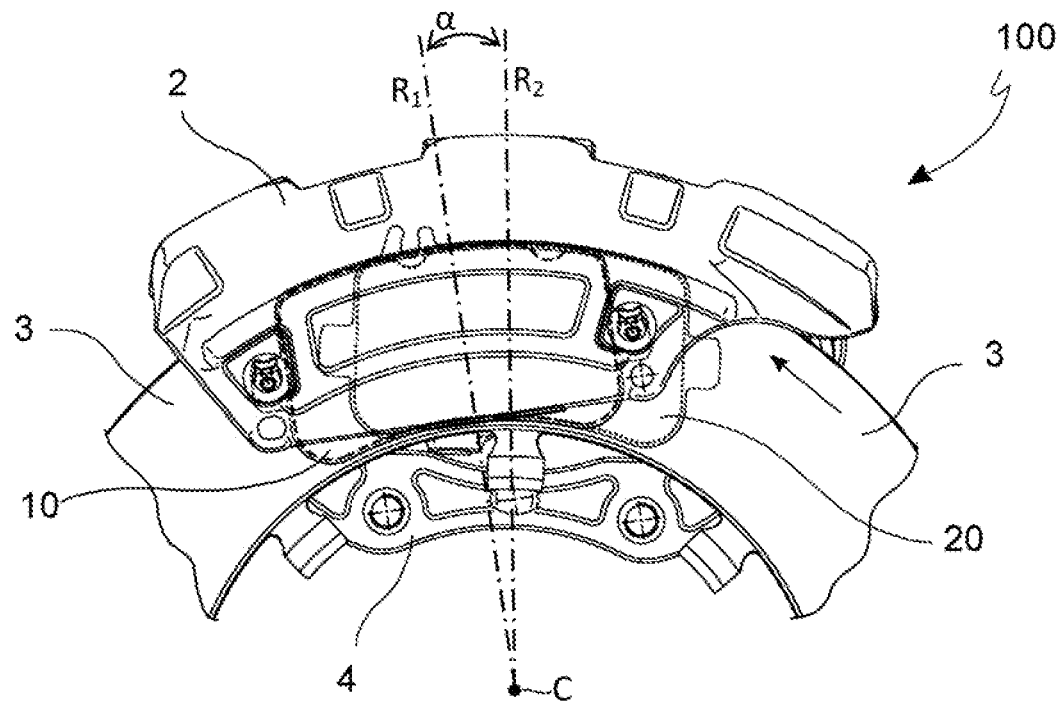
FIG. 4 shows a caliper assembly placed astride a brake disc in which the pads on support or vehicle side and the pads on reaction or wheel side are highlighted.
Figure 5:
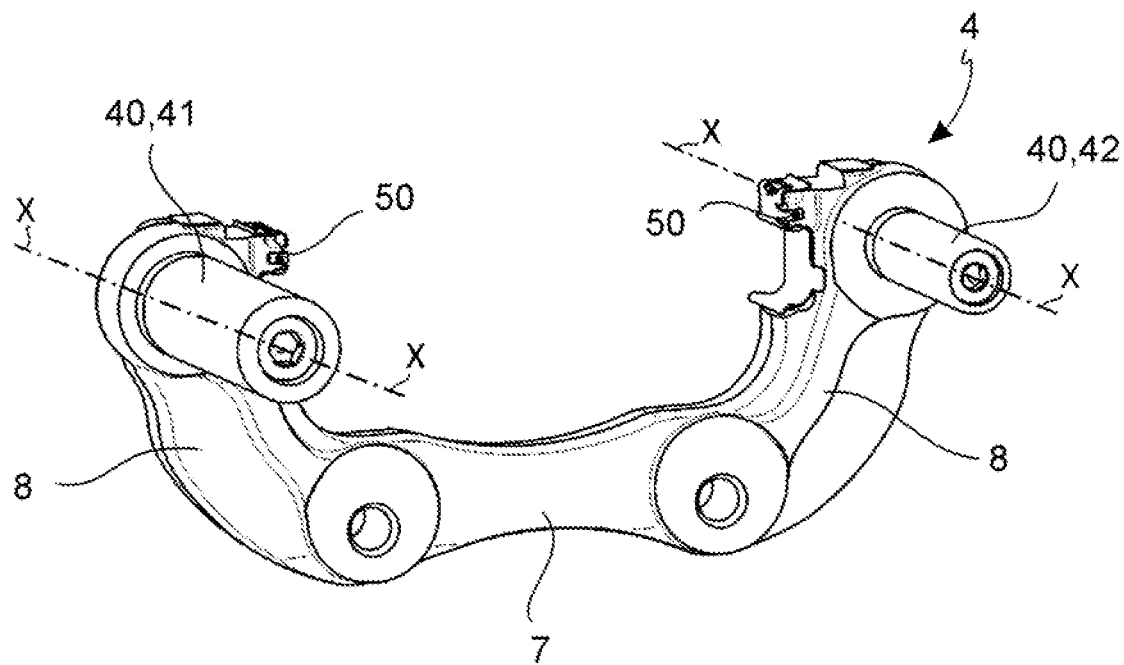
FIG. 5 is a perspective view of the bracket.
Figure 6:
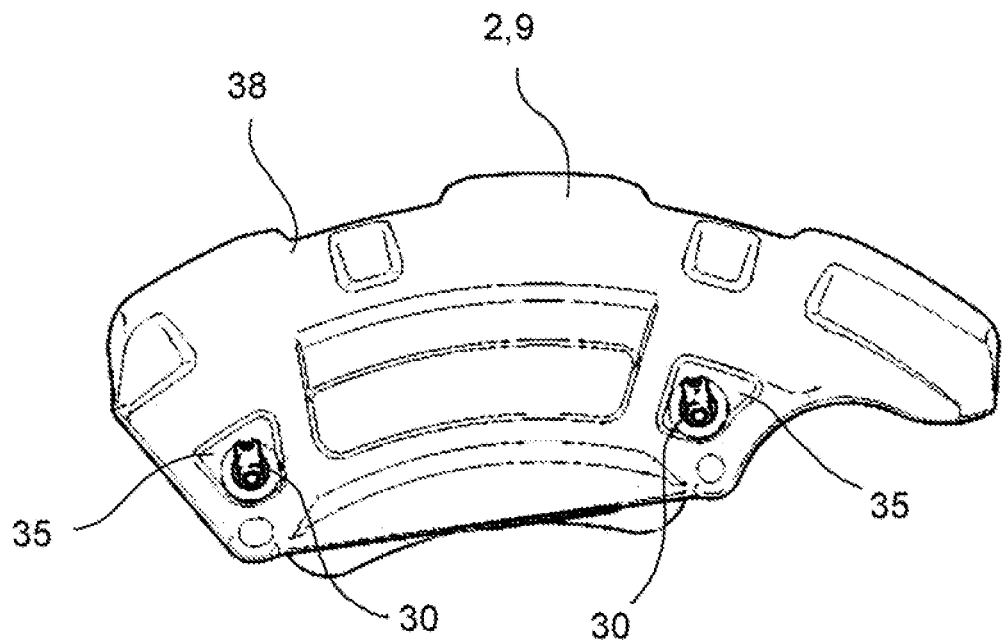
FIGS. 6 and 7 are a front view of the caliper body on outer side or reaction side of the caliper in FIG. 1, observed axially and externally, and a circumferential section along a middle plane of an associated brake disc of the caliper body observed from the position of the disc in axial direction towards the outer side.
Figure 7:
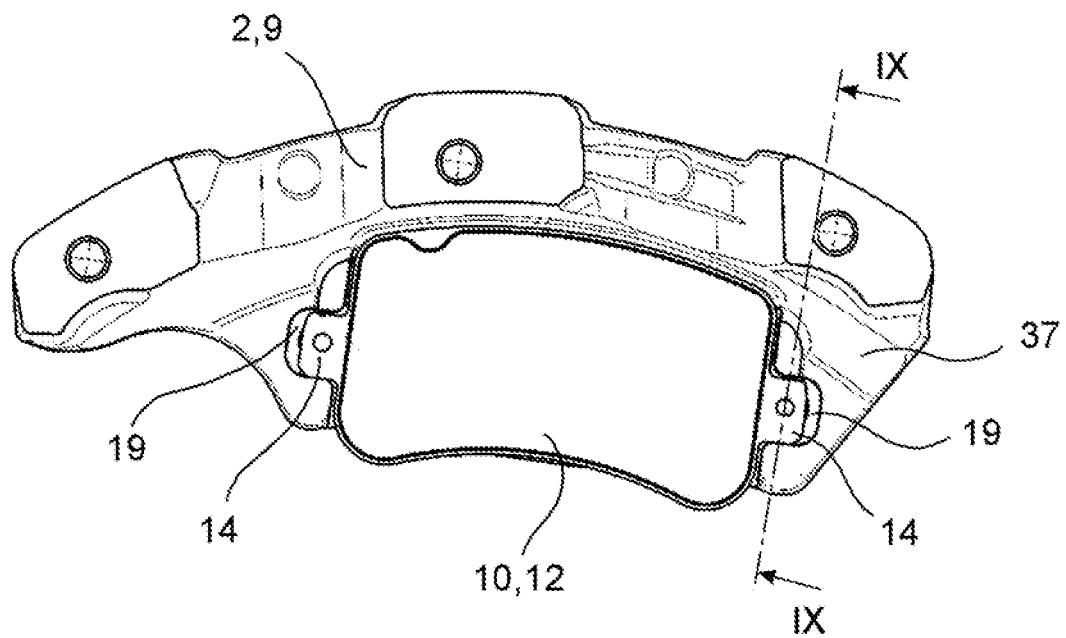
Figure 11:
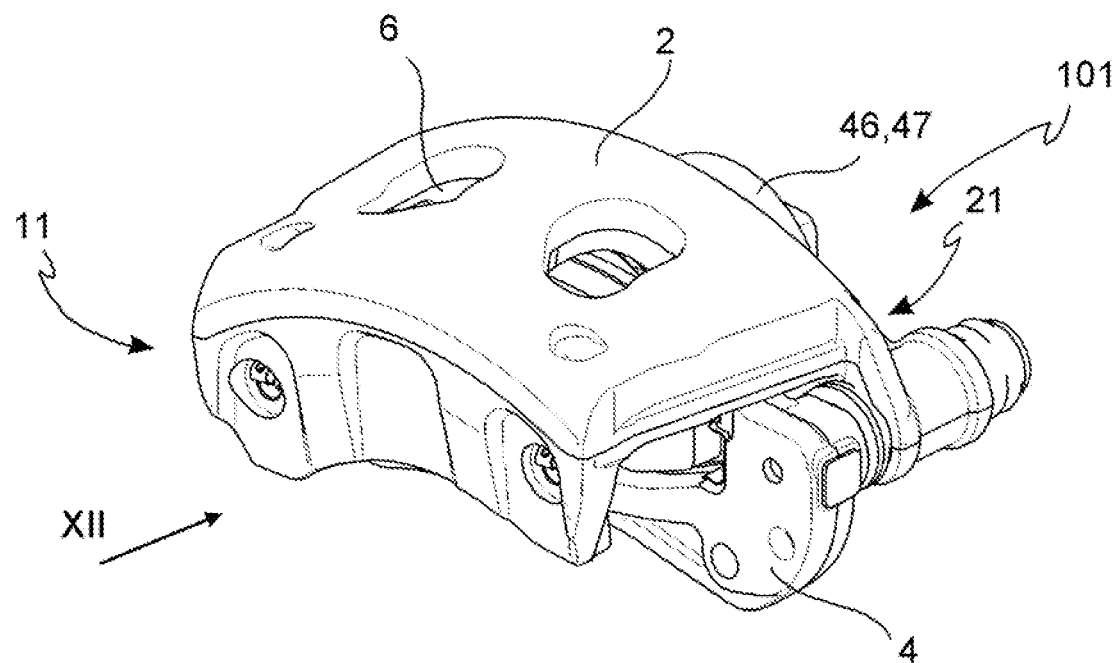
FIG. 11 is a perspective view according to a further variant embodiment of the invention.
Figure 12:
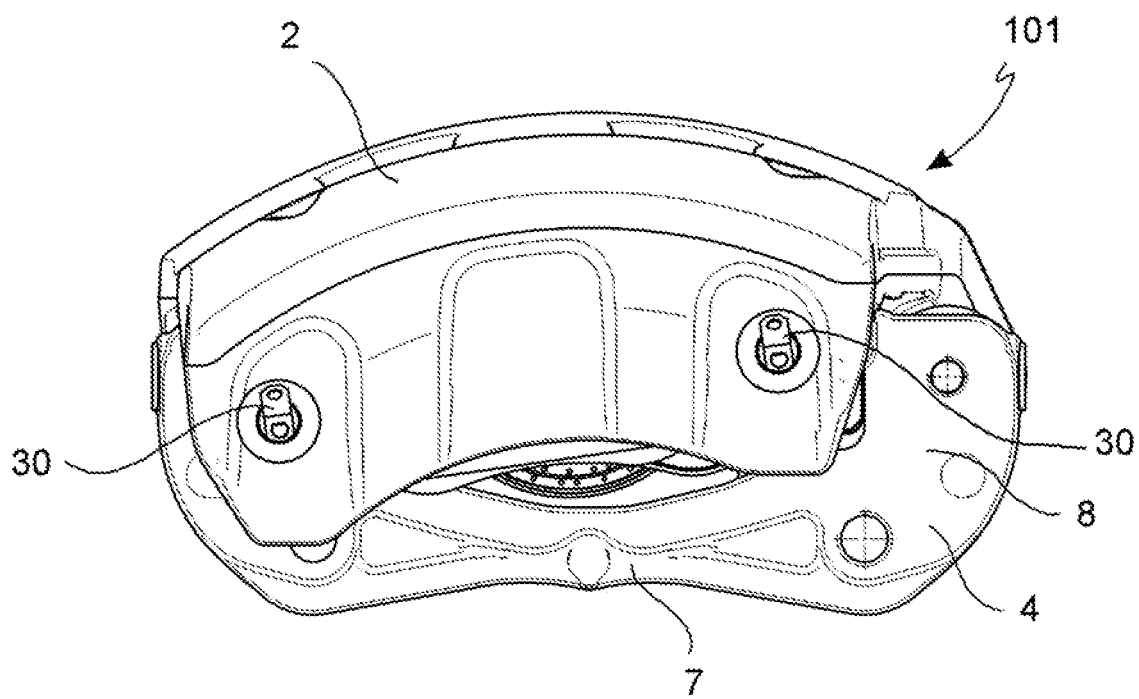
FIG. 12 is a front view of the caliper in FIG. 11, taken along the side indicated by arrow XII in FIG. 11.
Figure 13:
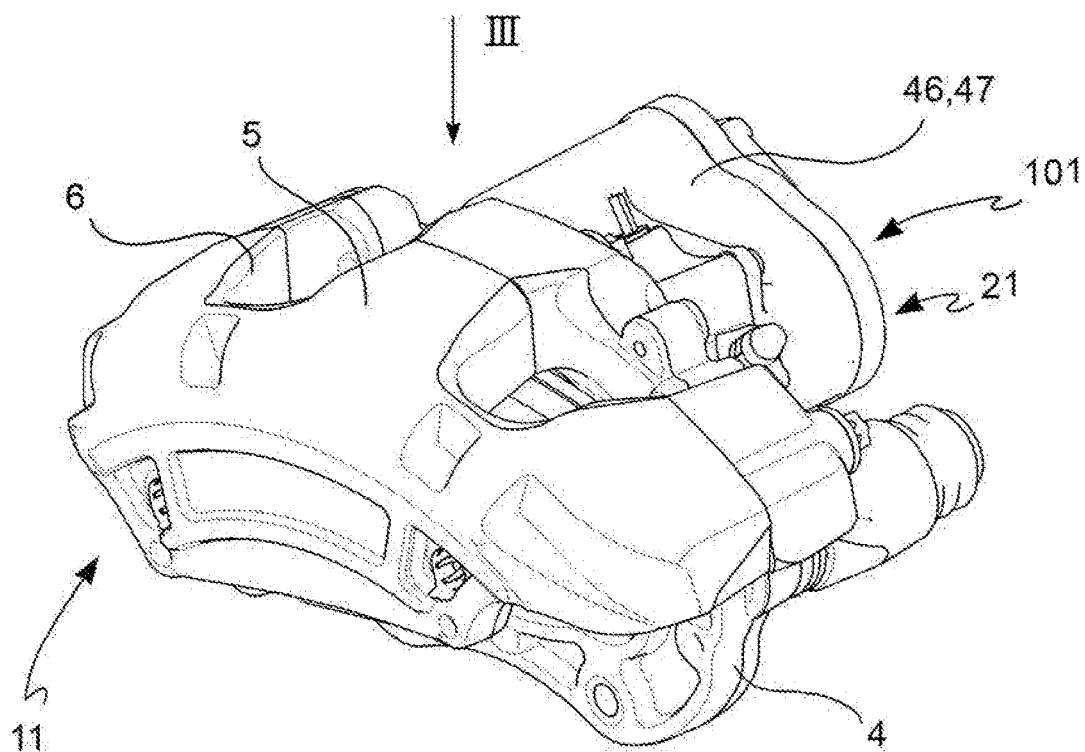
FIGS. 13 and 14 are perspective views of a floating caliper according to a further embodiment of the invention.
Figure 14:
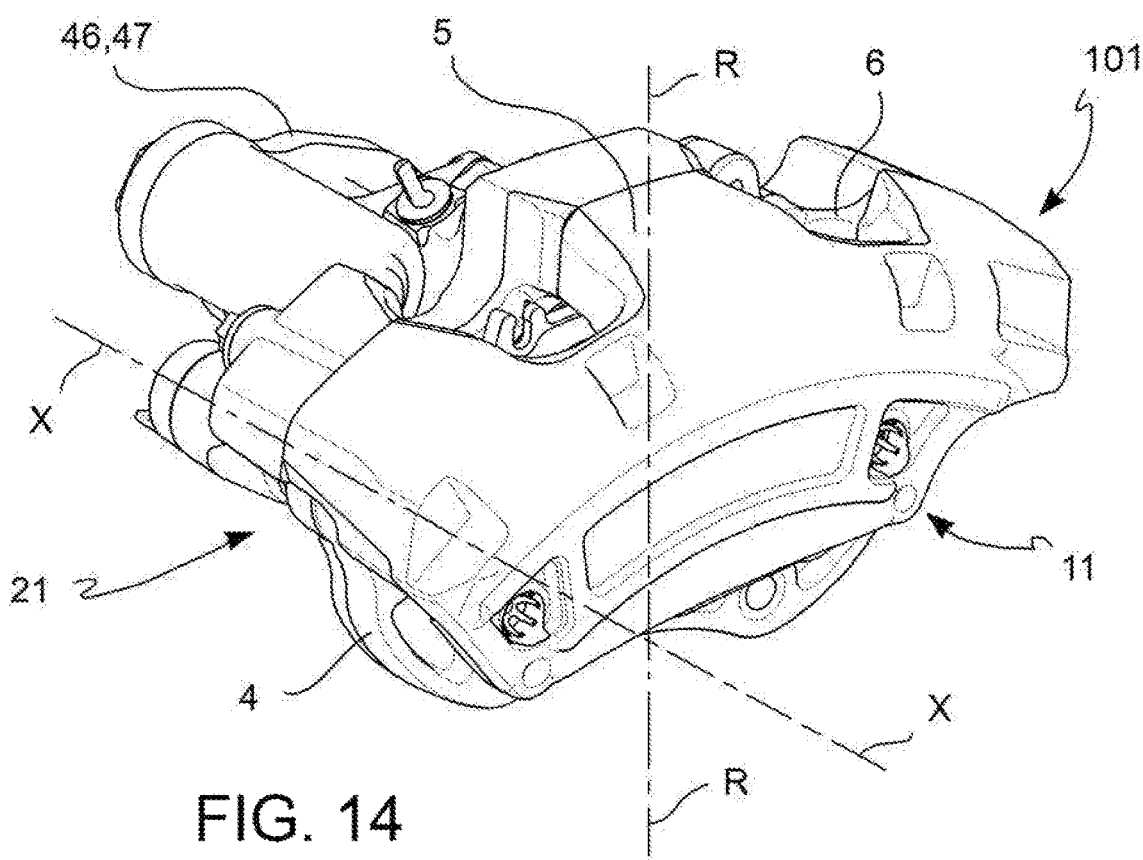
Figure 15:
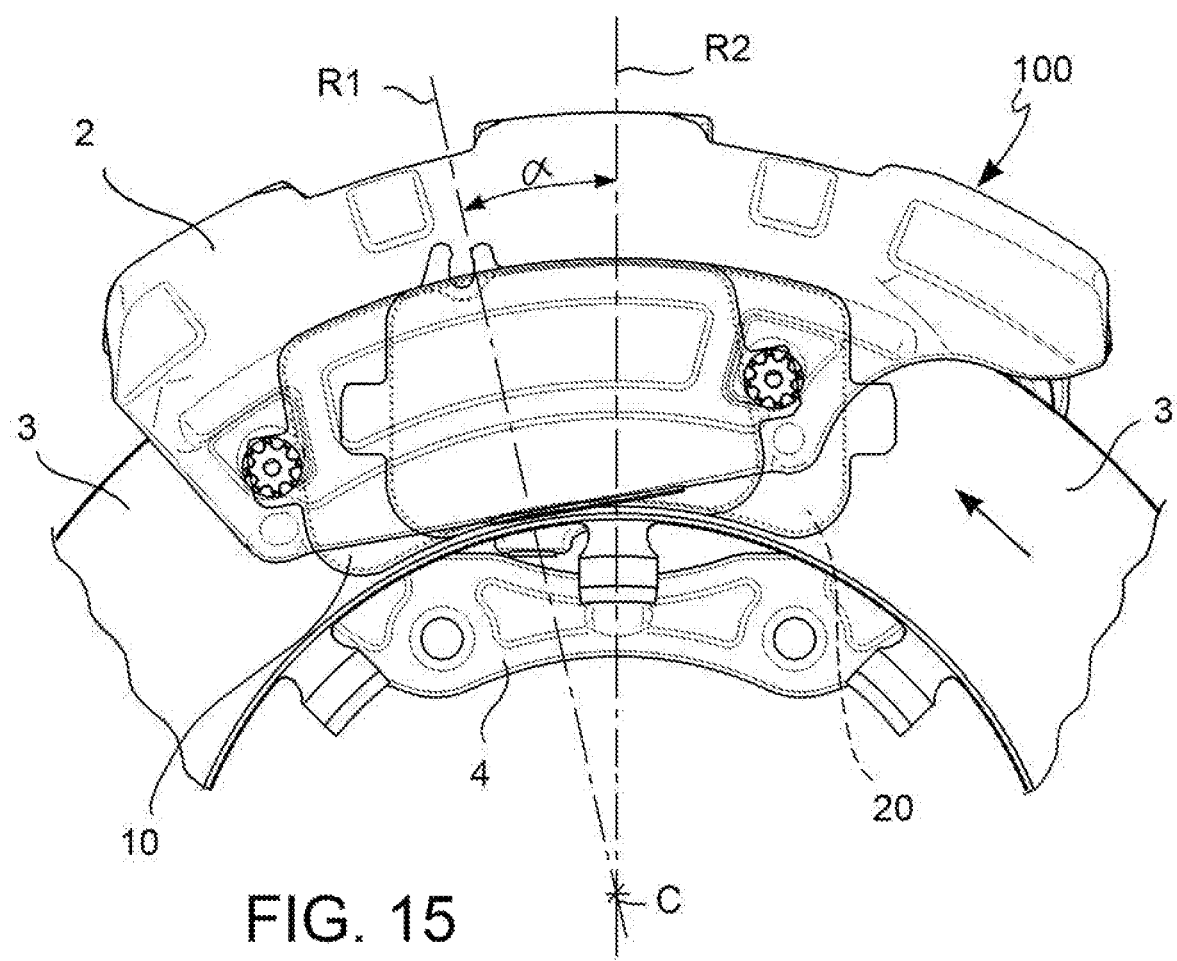
FIG. 15 shows the caliper assembly in FIG. 14 placed astride a brake disc in which the pads on support or vehicle side and the pads on reaction or wheel side are highlighted.
Figure 16:
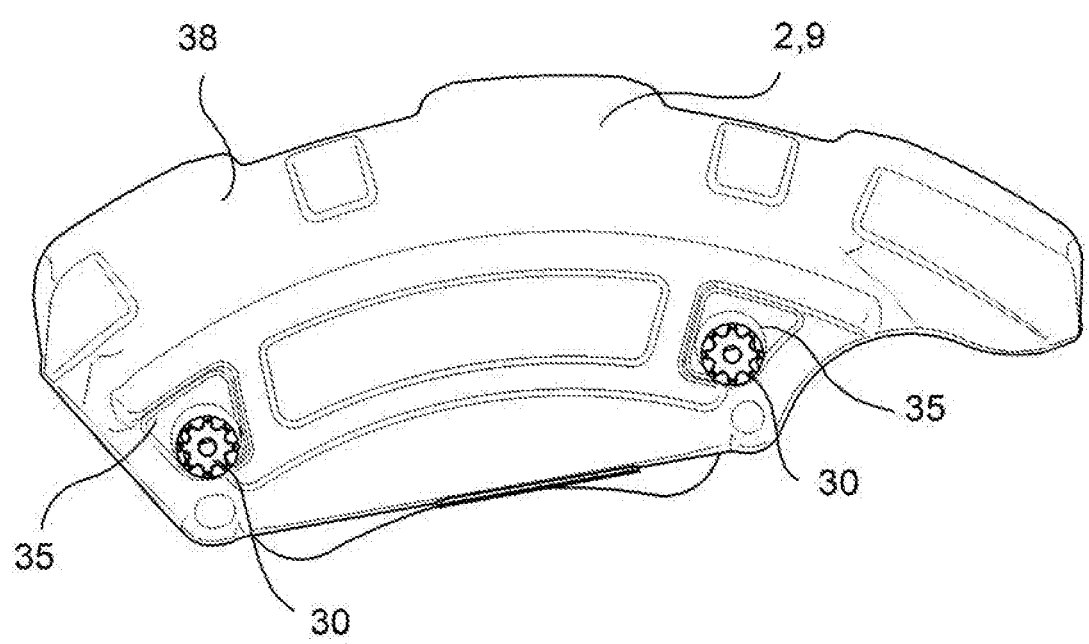
FIG. 16 is a front view of the caliper body on outer or reaction side of the caliper in FIG. 13 observed axially and externally.
Figure 17:
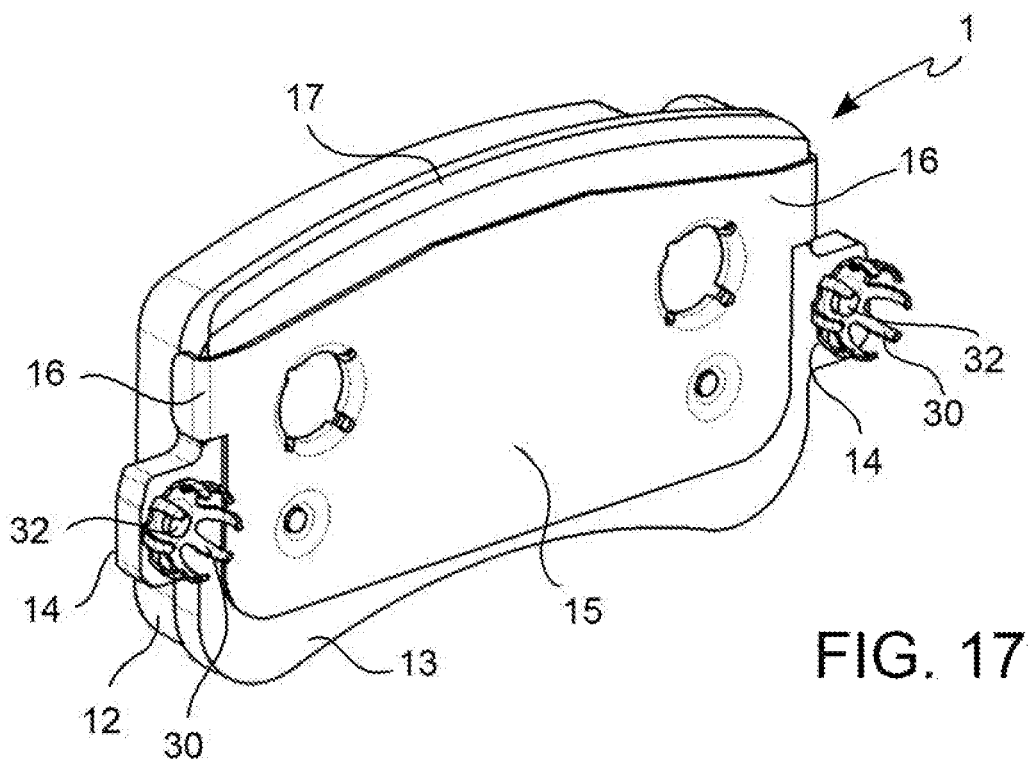
FIG. 17 is a perspective view of a pad on reaction side.
Figure 18:
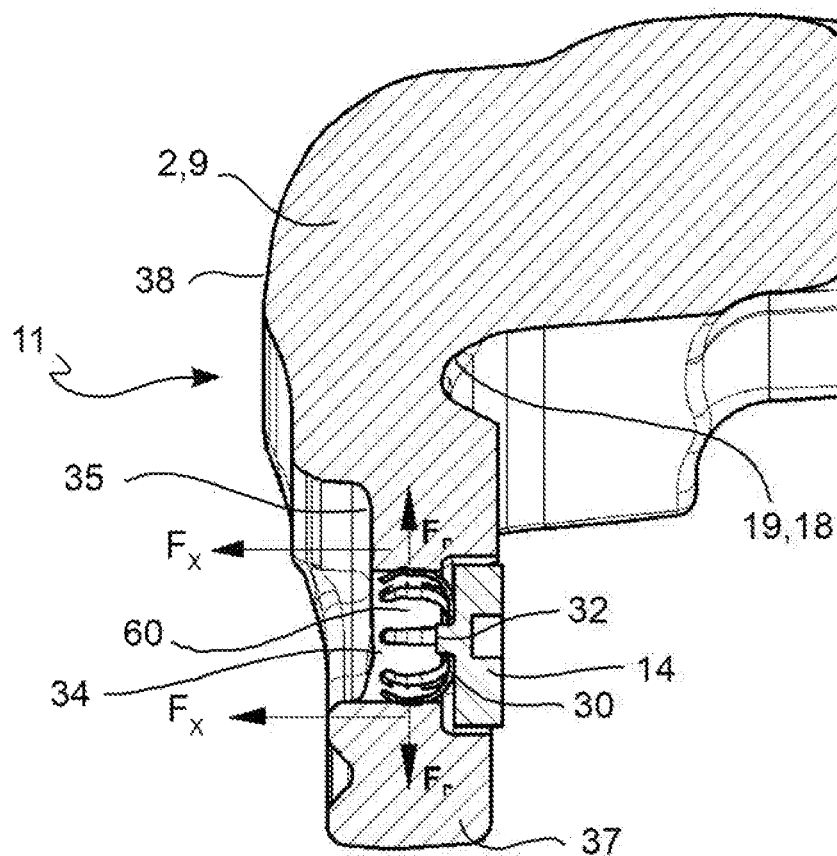
FIG. 18 is a section view taken along the line IX-IX in FIG. 16.
Figure 19:
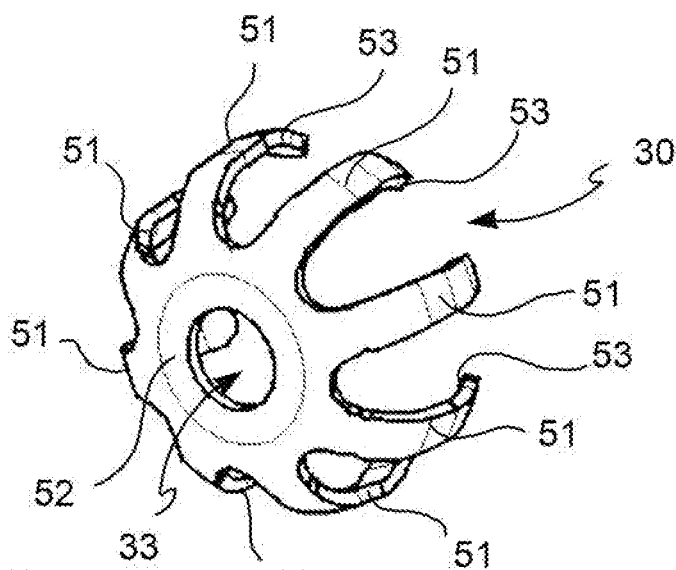
FIG. 19 is an enlarged perspective view of a spring according to a further embodiment of the invention.
Figure 20:
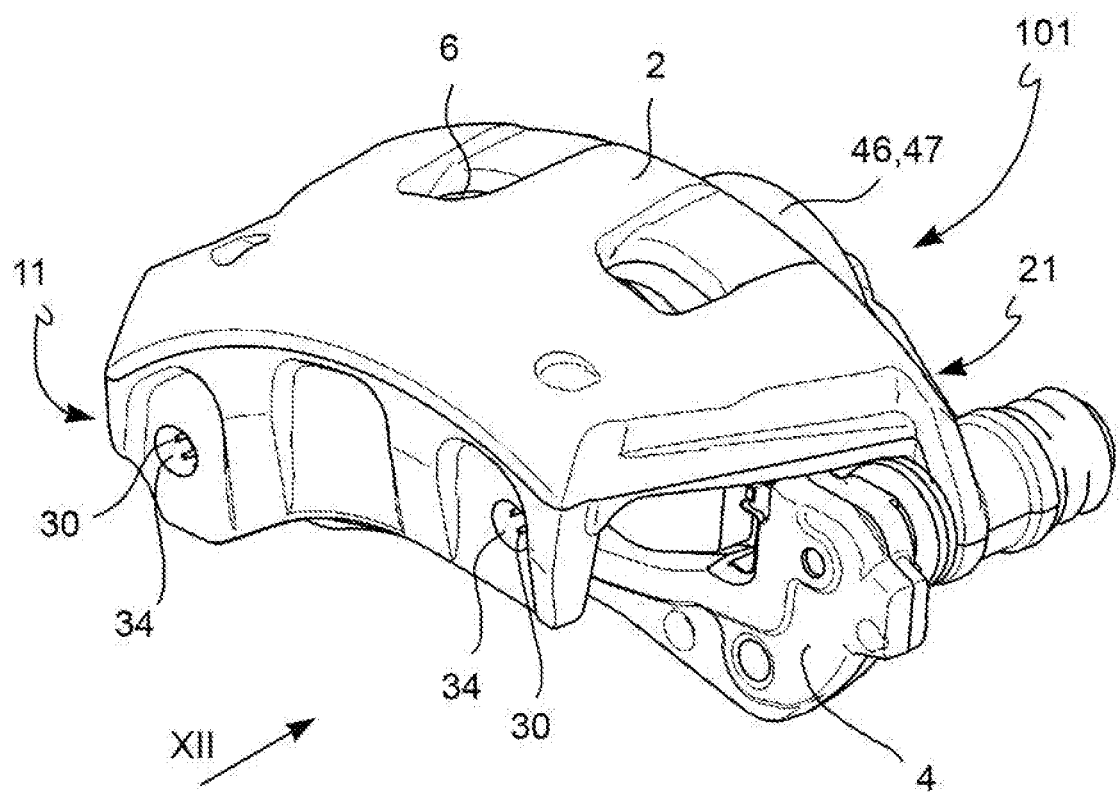
FIG. 20 is a perspective view of a further variant embodiment of the invention.
Figure 21:
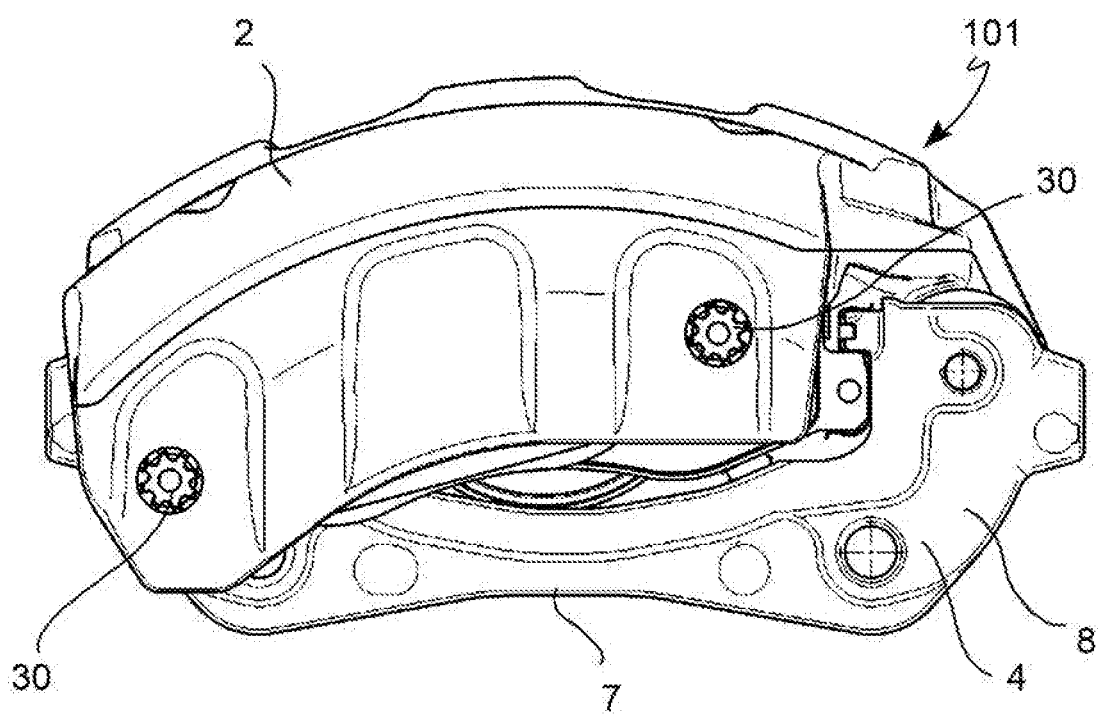
FIG. 21 is a front view of the caliper in FIG. 20, taken along the side indicated by arrow XII in FIG. 20.

Common elements or element parts in the embodiments described below will be indicated using the same reference numerals.

With reference to the figures, a caliper assembly for disc brake is globally indicated by reference numeral 1.

An assembly 1 for a disc brake caliper 100 has, when said caliper 101 is arranged astride a disc 3 of a disc brake 100 having a defined rotation axis (C), an axial direction (X-X) parallel to said rotation axis (C), a radial direction (R-R) orthogonal to said axial direction (X-X) and a tangential or circumferential direction (T-T) orthogonal to both the axial direction (X-X) and to the radial direction (R-R).

Said assembly 1 comprises a first pad 10 comprising a friction material 12, defining a friction surface, and a support plate 13 which supports said friction material 12 and is adapted to release the braking action onto the caliper 101 of the disc brake 100.

Said support plate 13 comprises at least one lateral projection 14, which extends in a direction substantially coplanar with the plate 13 and is placed at an end of the support plate 13.

Said at least one lateral projection 14 is adapted to be accommodated in a pocket 19 obtained in the body of the caliper 101.

Said assembly 1 further comprises at least one spring 30. Said spring 30 is connected to said lateral projection 14 of said plate 13.

Said spring 30 is adapted to be accommodated in a seat 34 obtained in the body of the caliper 101 at said pocket 19.

Said seat 34 is delimited by at least one seat wall 60.

Advantageously, said spring 30 is adapted to be inserted in said seat 34 to be fastened to said seat wall 60 to bias said pad 10 in the axial direction X-X.

Furthermore, said support plate 13 advantageously comprises at least one pair of opposite lateral projections 14 which extend in direction substantially coplanar with the plate 13 and are placed at opposite ends of the support plate 13, and said assembly 1 comprises at least one pair of springs 30, and each spring 30 is connected to each lateral projection 14 of said plate 13.

According to a possible embodiment, not necessarily comprising all the other features presented here, each of said springs of said pair of springs 30 is a spring in one piece, and each of said springs 30 is adapted to bias the pad 10 with respect to the caliper 101 also in radial direction R-R.

According to a possible embodiment, not necessarily comprising all the other features presented here, said spring 30 is a leaf spring which is adapted to be press-fastened, like a clip spring, in the seat 34 provided in the body of the caliper 101.

According to a possible embodiment, not necessarily comprising all the other features presented here, said at least one lateral projection 14 comprises a pin 32. Said spring 30 comprises an opening 33, e.g. a through hole, adapted to cooperate with said pin 32 to geometrically couple, e.g. by forcing, said spring 30 to the plate 13.

According to a possible embodiment, not necessarily comprising all the other features presented here, each spring 30 of said pair of springs comprises at least two mutually opposed elastic arms 51 adapted to be abutted against the wall 60 of said seat 34 to fasten said spring 30 to said seat 34 by means of a force coupling, which is firm during operation, but easy to insert and remove for fast, accurate and safe replacement of the pads or in all cases for brake caliper maintenance.

According to a possible embodiment, not necessarily comprising all the other features presented here, each spring 30 comprises a plurality of arms 51, e.g. eight arms, circumferentially distributed, like petals, and substantially protruding transverse to said lateral projection 14.

According to a possible embodiment, not necessarily comprising all the other features presented here, said plurality of arms 51 project from an anchoring base 52 provided with a coupling hole 33 adapted to fit with interference a pin 32 provided on each of said lateral projections 14.

According to a possible embodiment, not necessarily comprising all the other features presented here, each of said elastic arms 51 projects from said anchoring base 52 spreading to then taper towards a free end thereof to form a converging end portion 53 adapted to form, with an outer surface thereof facing towards the seat 34, a lead-in chute for coupling the spring 30 to the respective seat by means of an axial movement X-X of the plate 13 towards the caliper.

According to a possible embodiment, not necessarily comprising all the other features presented here, each of said springs 30 is obtained from a sheared and bent leaf.

According to a possible embodiment, not necessarily comprising all the other features presented here, each of said seats 34 has a predetermined width transverse to the longitudinal extension thereof, longitudinal direction e.g. coinciding with the axial direction X-X, and in which said at least two elastic arms 51 are mutually opposed and, in extended condition not coupled to the seat 34, have at least one portion thereof which is distanced from the opposed portion of the facing arm 51 by a distance which is greater than the predetermined transverse width of the seat 34, so as to guarantee a force coupling between said spring 30 and the respective seat 34, so that by entering in its seat the spring elastically compresses, folding the arms, forcing onto the walls of the seat to exert a friction action in axial direction X-X and an elastic action in radial direction R-R.

According to a possible embodiment, not necessarily comprising all the other features presented here, a caliper 101 comprises a caliper body 2.

Said caliper body 2 comprises an inner side 21 or support side 21, and an outer side 11, or reaction side 11.

Said outer side 11 comprises an inner surface 37 able to face a pad 10 and the brake disc 3 and an opposite outer surface 38.

Said outer side 11 comprises at least one pocket 19 adapted to accommodate at least one lateral projection 14 of a pad 10, and at least one seat 34 adapted to accommodate at least one spring 30, and having at least one seat wall 60 adapted to cooperate with said spring 30.

Said outer side 11 comprises an assembly 1 according to any one of the embodiments described above and adapted to face a side of an associable brake disc 3.

Said inner side 21 comprises a second pad 20 opposite to the first pad 10 and adapted to face the opposite side of an associable brake disc 3.

According to a possible embodiment, not necessarily comprising all the other features presented here, said caliper 101 is a floating caliper comprising a bracket 4 adapted to be arranged on one side of the brake disc 3, said bracket 4 is adapted to support the caliper body 2 in sliding manner.

According to a possible embodiment, not necessarily comprising all the other features presented here, said pocket 19 is made in the form of a through hole in the caliper body 2 with a closed cross section.

According to a possible embodiment, not necessarily comprising all the other features presented here, said pocket 19 comprises walls adapted to define a guide 18 adapted to accommodate a protuberance 17 made on a portion of said pad 10.

According to a possible embodiment, not necessarily comprising all the other features presented here, said pocket 19 is adapted to apply tangential clearance between said pad 10 and the walls of said pocket 19.

According to a possible embodiment, not necessarily comprising all the other features presented here, said first pad 10 and said second pad 20 are adapted to be arranged substantially at the same distance from the center of rotation C of an associable brake disc 3.

According to a possible embodiment, not necessarily comprising all the other features presented here, said first pad 10 has a first center of thrust or barycenter of the biasing actions of the pad 10 on the corresponding facing braking surface of the brake disc 3 and said second pad 20 has a second center of thrust or barycenter of the biasing actions of the pad 20 on the corresponding facing braking surface of the brake disc 3. The lines R1, R2 joining the projections of the first center of thrust with the rotation axis C of the brake disc 3 and the second center of thrust with the rotation axis C of the brake disc 3, both evaluated on a plane parallel to a brake disc associable with said caliper 101, mutually define a predetermined angle α.

According to a possible embodiment, not necessarily comprising all the other features presented here, a brake disc 100 comprises a caliper 101 according to any one of the embodiments described herein.

The present invention also relates to a method for installing an assembly 1 for a brake disc 100, comprising the steps of:

providing an assembly 1 as defined in any one of the embodiments described herein;

coupling the spring 30 with the support plate 13 of the pad 10;

inserting the protuberance 17 of said pad 10 in the guide 18 obtained in the pocket 19 of the caliper body 2;

moving the pad 10 with respect to the guide 18 so as to insert said spring 30 into the seat 34 obtained in the outer side 11 of the caliper body 2;

moving the pad 10 in the axial direction X-X so as to couple with force said spring 30 against said seat wall 60 obtained in the caliper body 2.

According to a further general embodiment of the present invention, an assembly 1 for a disc brake caliper 100, in which, when said caliper 101 is arranged astride a disc 3 of a disc brake 100 having a defined rotation axis C, said assembly 1 defines an axial direction X-X parallel to said rotation axis C, a radial direction R-R orthogonal to said axial direction X-X and a tangential or circumferential direction T-T orthogonal to both the axial direction X-X and the radial direction R-R, said assembly 1 comprises a first pad 10 comprising a friction material 12, defining a friction surface, and a support plate 13 which supports said friction material 12 and is adapted to release the braking action onto the caliper 101 of the disc brake 100, in which said support plate 13 comprises at least one lateral projection 14 which extends in a direction substantially coplanar to the plate 13 and is placed at an end of the support plate 13, and in which said at least one lateral projection 14 is adapted to be accommodated in a pocket 19 obtained in the body of the caliper 101.

Said assembly 1 further comprises at least one spring 30, said spring 30 is connected to said lateral projection 14 of said support plate 13, and said spring 30 is adapted to be accommodated in a seat 34 formed in the body of the caliper 101 at said pocket 19.

Said seat 34 is adapted to put the surface of the body of the caliper 101 facing the disc 3 into communication with an opposite surface 35 arranged undercut with respect to said support plate 13, and in which said spring 30 is adapted to be at least partially interposed between said lateral projection 14 of the plate 13 and the pocket 19.

Said spring 30 is adapted to cooperate with walls of the pocket 19 to bias said pad 10 with respect to the caliper 101 in the radial direction R-R.

Said assembly is characterized in that said spring 30 is adapted to be inserted in said seat 34 to be fastened in an undercut manner against the undercut surface 35 to bias the pad 10 in the axial direction X-X.

Said spring 30 is a spring in one piece, in which a first end 31 of said spring 30 is adapted to be at least partially interposed between said lateral projection 14 of the support plate 13 and said pocket 19 to bias the pad 10 with respect to the caliper 101 in the radial direction R-R, and in which a second hooked end 36 of said spring 30 is adapted to be inserted in said seat 34 to be fastened in an undercut manner against said undercut surface 35 to bias said pad 10 in the axial direction X-X.

Particularly, said first end 31 of said spring 30 exchanges a force $F_r$ in radial direction R-R with said walls of said pocket 19 and said lateral projection 14 of the plate 13.

Particularly, said second hooked end 36 of said spring 30 is adapted to exchange a force $F_x$ in axial direction X-X with said undercut surface 35.

According to an embodiment, said spring 30 is a leaf spring which is adapted to be snap-fastened, like a clip spring, in an undercut manner in the body of the caliper 101.

According to an embodiment, said spring 30 in one piece may be obtained with two or more spring portions welded firmly to one another, e.g. either riveted or welded or glued.

Advantageously, said spring 30 is inserted in the seat 34 obtained in the body of the caliper 101 and the coupling of the spring 30 to an opposite surface 35 arranged undercut by passing through the body of the caliper 101 occurs by inserting a separate component, such as for example a pin, in the body of the caliper 101.

Indeed, a solution which envisages the use of a pin then coupled by a separate spring imposes a complex insertion operation of the pad, of the pin and of a separate, thus losable, component, such as, for example, a split pin, consequently making it necessary to operate on two sides of the body of the caliper 101, while the invention allows to insert the pad 10 only on one side of the body of the caliper 101, because the spring 30, and particularly said second hooked end 36 of the spring 30, is able to close by entering in the seat 34 to then spread in undercut manner upon exiting.

According to an embodiment, said at least one lateral projection 14 of the support plate 13 comprises a pin 32, said pin 32 comprises a dissymmetrical cross section, and said spring 30 comprises a dissymmetrical opening 33 adapted to cooperate with said pin 32 to orient the position of the spring 30 with respect to the support plate 13.

Advantageously, the dissymmetrical pin 32 and the opening 33 of the spring 30 cooperate to orient the relative position of the spring 30 and the plate 13 during the step of installing of the spring 30 on the plate 13.

According to an embodiment, said spring 30 is made starting from laminated metallic material and is mounted on the support plate 13 of the pad 10 by means of a riveting process.

According to an embodiment, said support plate 13 comprises at least one pair of opposite lateral projections 14 which extend in direction substantially coplanar with the plate 13 and are placed at opposite ends of the support plate 13, and said assembly 1 further comprises at least one pair of springs 30, in which each spring 30 is connected to each lateral projection 14 of said plate 13.

According to an embodiment, said caliper 101 comprises a caliper body 2, in which said caliper body 2 comprises an inner side 21, or support side 21, or side facing the vehicle, and an outer side 11, or reaction side 11, or side facing the vehicle wheel.

The caliper body 2 may be of the single block type or may comprise a pair of half bodies 9 joined by means of connection means, e.g. screws or rivets. The caliper body 2 may further comprise a plurality of ribs 5 which extend astride an associable brake disc 3, defining ventilation openings 6 between consecutive ribs.

Said outer side 11 comprises an inner surface 37 able to face a pad 10 and the brake disc 3 and an opposite outer surface 38.

Said outer side 11 of the caliper body 2 comprises at least one pocket 19 adapted to accommodate at least one first pad 10, at least one seat 34 adapted to accommodate at least one spring 30, at least one undercut surface 35 with respect to said inner surface 37 adapted to cooperate with said second hooked end 36 of said spring 30, and in which said outer side 11 comprises an assembly 1 as described above.

According to an embodiment, said pocket 19 is made in the form of a through hole in the caliper body 2 with a closed cross section, and said pocket 19 comprises walls adapted to define a guide 18 adapted to accommodate a protuberance 17 made on a portion of said pad 10.

Advantageously, said protuberance 17 made on a portion of said pad 10 cooperates with said guide 18 contained in the caliper body 2 to bias the installation of said assembly 1 for brake disc caliper 100 in the caliper body 2.

According to an aspect of the invention, a method for installing an assembly 1 for a caliper of a disc brake 100 in the caliper body 2 comprises the steps of:
  providing an assembly 1 as defined above;
  coupling the spring 30 with the support plate 13 of the pad 10;
  inserting the protuberance 17 of said pad 10 in the guide 18 obtained in the pocket 19 of the caliper body 2;
  moving the pad 10 with respect to the guide 18 so as to insert said spring 30 into the seat 34 obtained in the outer side 11 of the caliper body 2;
  moving the pad 10 in axial direction X-X so as to snap-fasten said spring 30 against the undercut opposite surface 35 obtained in the outer side 11 of the caliper body 2.

Advantageously, the method described above allows to install an assembly 1 for caliper of a brake disc 100 in the caliper body 2 simply by operating from one side of the caliper body 2, and the assembly 1 may be installed by an operator using one hand.

According to an embodiment, a noise-deadening sheet 15 is arranged in contact with the support plate 13 of said first pad 10 and interposed between said support plate 13 and the walls of said pocket 19 obtained in the caliper body 2.

Advantageously, said noise-deadening sheet 15 comprises folded shoulders 16 which cooperate with said pad 10 in tangential direction T-T in order to release the braking action on the pad 10 in tangential direction T-T.

According to an embodiment, said pocket 19 is adapted to impose a clearance in tangential direction T-T between said pad 10 and the walls of said pocket 19 to minimize the efforts in tangential direction T-T acting on the lateral projections 14 of the support plate 13 of the pad 10, already burdened by the stresses in axial direction X-X and in radial direction R-R and subject to potential displacement during the braking action as a consequence of the connection to the caliper body 2 by means of spring 30.

According to an embodiment, the inner side 21 of the brake body 2 comprises a second pad 20 opposite to the first pad 10 and facing an associable brake disc 3 on the opposite side.

According to an embodiment, said first pad 10 and said second pad 20 are arranged substantially at the same distance from the center of rotation C of an associable brake disc 3, i.e. the braking band of an associable brake disc 3 is substantially the same for both pads 10, 20.

In particular, said first pad 10 has a first center of thrust or barycenter of the biasing actions of the pad 10 on the corresponding facing braking surface of the brake disc 3, and said second pad 20 has a second center of thrust or barycenter of the biasing actions of the pad 20 on the corresponding facing braking surface of an associable brake disc 3. The lines $R_1$, $R_2$ joining the rotation axis C of an associable brake disc 3 and the projections of the first center of thrust and of the second center of thrust on a plane parallel to a brake disc 3 associable with said caliper 101 mutually define a predetermined angle $\alpha$.

Advantageously, said misalignment of the opposite pads 10, 20 facing opposite sides of an associable brake disc 3 allows to counterbalance the moment generated by the friction forces, e.g. F' and F'', exchanged between the braking surfaces of an associable brake disc 3 and facing friction surfaces of pads 10, 20.

Advantageously, counterbalancing said moment generated by the friction forces, e.g. F' and F''', exchanged between braking surfaces of an associable brake disc 3 and facing friction surfaces of pads 10, 20, allows to obtain a better accuracy of the braking action, the dimensions of the disc brake system 100 being equal, with respect to known solutions, or to reduce the dimensions of the brake disc system 100, the performance level being equal.

From an analysis performed by the inventors, it arises that said misalignment biases the uniformity of the degree of wear of the friction material 12 of the pads 10, 20, in conditions of prolonged use of the braking system and depends on the choice of the value of the angle α. The choice of the value of said angle α depends on factors of geometric type, such as, for example, the thickness of a brake disc 3 associable to the caliper 101, and may be identified either mathematically or empirically.

According to an embodiment, said caliper 101 is a floating caliper comprising a bracket 4 adapted to be arranged only on one side of the brake disc 3, said bracket 4 is adapted to support the caliper body 2 in sliding manner.

Advantageously, the bracket 4 is adapted to be arranged only on one side of an associable brake disc 3, and particularly the inner side 21, or support side 21, allows to make a caliper 101 having improved features of lightness with respect to known solutions or solutions in which the bracket 4 is made on both sides of the caliper 101.

According to an embodiment, said bracket 4 is "U"-shaped, comprising a crosspiece 5 and an upright 8 to each of the opposite ends of the crosspiece 7.

The crosspiece 7 and the uprights 8 at least partially delimit a seat adapted to receive at least one second pad 20.

According to an embodiment, the bracket 4 is made of aluminum or aluminum alloy, by means of a foundry process.

According to a variant embodiment, the bracket 4 is made of steel or stainless steel or cast iron by means of a foundry process.

Guiding means 40 for the relative sliding in axial direction X-X of the caliper body with respect to the bracket 4 are arranged on a portion of said uprights 8 of said bracket 4.

According to an embodiment, said guiding means 40 are fixed to the bracket 4 by means of connection devices, such as for example screws or rivets.

According to an embodiment, said guiding means 40 comprise a primary stud bolt 41, which guides the relative sliding between caliper body 2 and bracket 4 along the axial direction, i.e. parallel to X-X, and a secondary stud bolt 42, which, in addition to guiding the sliding, prevents the rotation of the caliper body 2 with respect to the primary stud bolt 41 (in known manner).

According to an embodiment, the primary and secondary stud bolts 41, 42 are made of aluminum or aluminum alloy.

According to a variant embodiment, the primary and secondary stud bolts 41, 42 are made of steel or stainless steel or cast iron.

According to an embodiment, a plurality of springs 50 is arranged on at least one portion of said uprights 8 and said springs 50 influence the sliding in axial direction X-X (in known manner).

According to an embodiment, said springs 50 are made of steel or stainless steel.

According to an embodiment, the disc brake system 100 comprises at least one actuator 46 acting on the second pad 20, or pad positioned on the inner side 21, and said actuator 46 may be made in form of a hydraulic piston or an electrically actuated ratio motor 47 and may be used for service and/or parking braking.

According to an embodiment, said caliper 101 is intended for applications as rear caliper for motor vehicles, such as for example cars and/or commercial vehicles, for service and/or parking braking.

According to a variant embodiment, said caliper 101 is intended for applications as front caliper for motor vehicles, such as for example cars and/or commercial vehicles, for service and/or parking braking.

Several changes, adaptations and replacements of elements with others which are functionally equivalent may be made by a person skilled in art to the embodiments described above in order to satisfy contingent needs without however departing from the scope of protection of the appended claims.

REFERENCES

1. Assembly
2. Caliper body
3. Brake disc
4. Bracket
5. Ribs
6. Ventilation openings
7. Crosspiece
8. Upright
9. Caliper half-body
10. First pad
11. Outer or reaction or wheel side
12. Friction material
13. Support plate
14. Lateral projections of the plate
15. Front noise-deadening sheet
16. Folded shoulder
17. Pad protuberance
18. Guide
19. Pocket
20. Second pad
21. Inner or support or vehicle side
30. Spring
31. First end of the spring
32. Pin
33. Dissymmetrical opening
34. Spring seat
35. Undercut surface
36. Second hooked end of the spring
37. Inner surface reaction side
38. Outer surface reaction side
40. Guiding means
41. Primary stud bolt
42. Secondary stud bolt
46. Actuator
47. Ratio motor
50. Axial sliding spring
51. Elastic arms
52. Anchoring base
53. Converging end portion
60. Seat wall
100. Disc brake
101. Caliper
X-X. Axial direction
T-T. Tangential or circumferential direction
R-R. Radial direction
$R_1$. Line joining the rotation axis of the brake disc and the projection of the first center of thrust of the first pad on a plane parallel to the brake disc $R_2$. Line joining the rotation axis of the brake disc and the projection of the second center of thrust of the second pad on a plane parallel to the brake disc.

C. Rotation axis of the brake disc $\alpha$. Offset angle

F'. Friction force acting on the first pad

F". Friction force acting on the second pad $F_x$. Axial force $F_r$. Radial force

The invention claimed is:

1. A brake caliper, suitable to be arranged astride a disc of a brake disc having a defined rotation axis, comprising:
    a caliper body,
    and at least one assembly of pad and spring, comprising:
        at least one pad, having friction material and a support plate supporting the friction material;
        at least one leaf spring having a hooked end;
    wherein said support plate comprises at least one lateral projection which extends in a direction substantially coplanar with the support plate and is placed at opposite ends of the support plate;
        and wherein said at least one leaf spring is connected to the lateral projection;
        and wherein said assembly defines an axial direction parallel to the rotation axis of the disc, a radial direction orthogonal to the axial direction, and a tangential direction orthogonal to both the axial direction and the radial direction;
        said caliper body comprises an inner side and an outer side,
        wherein said outer side of the caliper body comprises an inner surface, able to face the at least one pad and a brake disc, and an opposite outer surface;
        and wherein said outer side comprises:
            at least one pocket accommodating at least one lateral projection of the at least one pad,
            and at least one seat accommodating said at least one leaf spring,
            wherein said at least one seat passing through the caliper body,
            said at least one leaf spring is inserted in said at least one seat to be fastened in an undercut manner against an undercut surface of the caliper body to bias the at least one pad in the axial direction;
            wherein said pocket is made in the form of a through hole in the caliper body with a closed cross-section.

2. The brake caliper of claim 1, wherein said seat is a through hole.

3. The brake caliper of claim 1, wherein said support plate comprises one further lateral projection so that to comprise at least one pair of opposite lateral projections placed at opposite ends of the support plate, and said at least one assembly comprises a further leaf spring so as to comprise at least one pair of leaf springs, each leaf spring is connected to a respective lateral projection.

4. The brake caliper of claim 3, wherein each of said leaf springs is each in one piece.

5. The brake caliper of claim 1, wherein a first end of the at least one leaf spring exchanges force in the radial direction with walls of said at least one pocket and said lateral projections of the support plate.

6. The brake caliper of claim 5, wherein a second hooked end of said at least one leaf spring exchanges forces in the axial direction with said undercut surface of the caliper body.

7. The brake caliper of claim 1, wherein said at least one leaf spring snap-fastens in an undercut manner to the caliper body.

8. The brake caliper of claim 1, wherein said caliper body is a floating caliper comprising a bracket suitable to be arranged only on one side of the associable disc, said bracket supports said caliper body in a sliding manner.

9. The brake caliper of claim 1, wherein said at least one leaf spring is made of steel.

10. The brake caliper of claim 1, said at least one leaf spring cooperates with walls of said at least one pocket to bias the pad in respect to the caliper body in the radial direction.

* * * * *

UNITED STATES PATENT AND TRADEMARK OFFICE
CERTIFICATE OF CORRECTION

PATENT NO.          : 10,697,504 B2
APPLICATION NO.     : 15/547332
DATED               : June 30, 2020
INVENTOR(S)         : Woloszyn Tomasz, Simone Berra and Marco Ratti Page 1 of 1

It is certified that error appears in the above-identified patent and that said Letters Patent is hereby corrected as shown below:

In the Claims

Claim 2, Column 12, Line 7, should read "The brake caliper of claim 1, wherein said at least one seat . . ."

Signed and Sealed this
Eighteenth Day of August, 2020

Andrei Iancu
*Director of the United States Patent and Trademark Office*